E. D. MEAD.
Grain-Drill.
No. 165,015. 
Patented June 29, 1875.
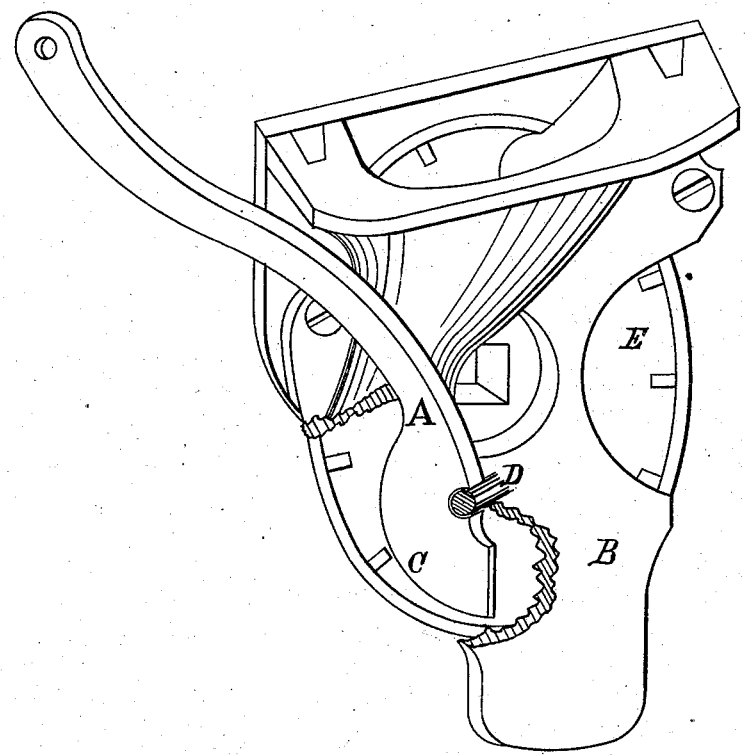
Witnesses:
Geo. H. Preston
N. K. Cole
Inventor:
Edwin D. Mead

UNITED STATES PATENT OFFICE.

EDWIN D. MEAD, OF SHORTSVILLE, NEW YORK.

IMPROVEMENT IN GRAIN-DRILLS.

Specification forming part of Letters Patent No. 165,015, dated June 29, 1875; application filed November 21, 1874.

*To all whom it may concern:*

Be it known that I, EDWIN D. MEAD, of Shortsville, county of Ontario, State of New York, have invented a Regulator or Cut-Off for Grain-Drills, of which the following is a specification:

The object of my invention is to increase or lessen the discharge-cavity of a distributer for grain-drills to permit the sowing of large or small seed, and to so regulate the discharging capacity of a distributer for a given seed as to sow any desired quantity, more or less, within the widest practical limits, without a change of gear or moving any of the working parts; also to accomplish this in a simple, reliable, and substantial manner, capable of the nicest graduation, not liable to be affected in its graduation by the discharge of the seed, but positive and reliable in its adjustment.

I use the common force-feed distributer, or its equivalent, entire, of which, reference being had to the drawing accompanying this specification, B represents the disk, E the run. Passing through the disk, the lower part of which is broken away in the drawing, and turning upon a pivot formed in the disk, is the regulator or cut-off C, the convex part of which corresponds to the concave surface of the run E. The outer and upper part of the cut-off terminates in the lever A, in the form shown. The series of levers, one from each distributer, are connected to a simple straight rod or bar, not shown in the drawing, giving to each the same positive motion and adjustment. One lever of the series terminates in an index-point, which, with a graduating-plate upon the side of the seed-box, shows the amount of seed sown. I make the discharge-cavity of the distributer large enough for the greatest amount of seed desired to be sown. Across this cavity extends the cut-off C, which, by a proper motion of the lever A, regulates the discharge of the seed from large to small quantities, as desired.

I am aware that a patent was granted to J. F. Winchell September 29, 1874, No. 155,562, for an improvement in feeding apparatus for seed-drills; but it will be observed that a wide and essential difference exists between the two inventions. Winchell regulates the discharge-opening of the distributer by moving the lower part of the case to or from the wheel. In my invention the case and feed-wheel or run retain at all times the same relative position, and the discharge is regulated by a cut-off independent of any change in the position of the feed-wheel or run and the case. It will also be observed that, by placing the regulator or cut-off directly across the discharge-cavity, through a hole in the disk, and moving on a center parallel with the surface of the same, and at right angles with the shaft of the run E, I secure a device that is held firmly in its place, and one in which there is little or no tendency to move from its adjustment by the discharge of the seed. The long sweep of the top of the lever A, compared with the movement of the cut-off C, secures nicety of graduation, and the absence of all intermediate joints, toothed segments, &c., gives a reliable and positive adjustment.

I do not confine myself to the particular form of distributer here shown, but would use any to which the cut-off, substantially as shown, could be applied.

What I claim as my invention, and desire to secure by Letters Patent, is—

The semicircular cut-off C, with its lever A, in combination with the concave feed-wheel E, for regulating the flow of seed, substantially as set forth.

EDWIN D. MEAD.

Witnesses:
N. K. COLE,
GEO. H. PRESTON.